United States Patent
Varadaraj et al.

(10) Patent No.: US 8,993,495 B2
(45) Date of Patent: Mar. 31, 2015

(54) UPGRADING DEASPHALTING RESIDUE TO HIGH PERFORMANCE ASPHALT

(75) Inventors: Ramesh Varadaraj, Flemington, NJ (US); Lyle E. Moran, Sarnia (CA); John Brownie, Brights Grove (CA); Mary J. Gale, Lambton Shore (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 503 days.

(21) Appl. No.: 13/309,940

(22) Filed: Dec. 2, 2011

(65) Prior Publication Data
US 2013/0143778 A1 Jun. 6, 2013

(51) Int. Cl.
| | | |
|---|---|---|
| C10M 169/04 | (2006.01) | |
| C10C 3/00 | (2006.01) | |
| C10C 3/02 | (2006.01) | |
| C08K 5/42 | (2006.01) | |
| C08L 91/00 | (2006.01) | |
| C08L 95/00 | (2006.01) | |
| C10G 21/00 | (2006.01) | |

(52) U.S. Cl.
CPC . *C08K 5/42* (2013.01); *C08L 91/00* (2013.01); *C08L 95/00* (2013.01); *C10G 21/003* (2013.01)
USPC .............................. 508/133; 208/23; 208/309

(58) Field of Classification Search
USPC .................................... 508/133; 208/23, 309
See application file for complete search history.

(56) References Cited

U.S. PATENT DOCUMENTS

| | | | |
|---|---|---|---|
| 4,713,117 A | 12/1987 | Goodrich | |
| 5,319,008 A * | 6/1994 | Janoski | ......................... 524/59 |
| 5,348,994 A | 9/1994 | Gorbaty et al. | |
| 6,403,659 B1 | 6/2002 | Boyer et al. | |
| 7,074,846 B2 | 7/2006 | Sylvester et al. | |
| 7,150,785 B2 | 12/2006 | Gale et al. | |
| 2007/0249762 A1 | 10/2007 | Sylvester | |

FOREIGN PATENT DOCUMENTS

| | | |
|---|---|---|
| DE | 220037 A1 | 3/1985 |
| DE | 220038 A1 | 3/1985 |
| WO | 2007011168 A1 | 1/2007 |

OTHER PUBLICATIONS

The International Search Report and Written Opinion of PCT/US2012/066975 dated Feb. 6, 2013.

* cited by examiner

*Primary Examiner* — Vishal Vasisth
(74) *Attorney, Agent, or Firm* — Larry E. Carter; Robert A. Migliorini

(57) ABSTRACT

A novel composition is provided that incorporates the residual solids from solvent deasphalting to make a high value asphalt product. A process for making the asphalt composition is also provided. A first portion of heavy oil or another feedstock can be deasphalted using propane deasphalting or another suitable deasphalting process. This generates a solvated fraction and an insoluble deasphalting residue. The deasphalting residue is then added to a second portion of heavy oil, such as a second portion of the same type of heavy oil that was used as feedstock in the solvent deasphalting. The mixture of deasphalting residue and heavy oil results in a novel dispersion that is suitable for use as an asphalt. Optionally, an additive such as an alkyl substituted aromatic sulfonic acid can be added to the composition to further improve the asphalt properties.

13 Claims, 2 Drawing Sheets

UPGRADING DEASPHALTING RESIDUE TO HIGH PERFORMANCE ASPHALT

FIELD

This disclosure provides high performance asphalt composition, and a method producing such a high performance asphalt composition using an alkane deasphalting residue.

BACKGROUND

One of the goals in maximizing the value of a petroleum feed is to find a valuable use for as much of the carbon content of the stream as possible. This goal becomes increasingly difficult to achieve for feeds with higher boiling fractions. For example, sonic heavy oil fractions are suitable for production of asphalt. While asphalt is a lower value product than a typical fuel, the asphalt has at least some commercial value. As an alternative, fractions suitable for asphalt production may also be suitable for a deasphalting process, such as propane deasphalting. A typical deasphalting process results in a higher value fraction suitable for further processing, such as to form a fuel or lubricant. However, a deasphalting residue is left behind. This deasphalting residue is technically an "asphalt". However, in many instances this deasphalting residue does not meet technical specifications for road paving or other typical asphalt uses. When the deasphalting residue is not suitable for another use, the deasphalting residue may instead be used for a lower value use, such as gasification to form syngas and $H_2$. This reduces the overall value of using a deasphalting process, as the value of the solvated (eventual fuel or lube) fraction is offset by the low value use of the deasphalting residue. Additionally, gasification of a deasphalting residue typically generates a substantial amount of $CO_2$. It is often desirable to reduce the amount of greenhouse gases generated during processing of a petroleum feed.

U.S. Pat. No. 7,150,785 describes high performance asphalt using alkyl aromatic sulfonic acid dispersants. Addition of alkyl substituted aromatic sulfonic dispersants is described as improving the performance qualities of asphalt compositions.

SUMMARY

In an embodiment, an asphalt composition is provided. The asphalt composition includes a mixture of a first heavy oil fraction and a deasphalting residue from solvent deasphalting of a second feedstock fraction, the first heavy oil fraction having a T5 boiling point of at least 350° C., the second feedstock fraction having a T5 boiling point of at least 350° C., wherein a weight ratio in the mixture of the first heavy oil fraction relative to the deasphalting residue is from 30:70 to 70:30.

In another embodiment, an asphalt composition is provided. The asphalt composition includes a mixture of a first portion of a heavy oil fraction and a deasphalting residue from solvent deasphalting of a second portion of the heavy oil fraction, the heavy oil fraction having a T5 boiling point of at least 350° C.

In still another embodiment, a method for producing an asphalt composition is provided. The method includes performing solvent deasphalting on a second feedstock fraction to produce a deasphalted oil and a deasphalting residue; and mixing the deasphalting residue with a first heavy oil fraction to form a mixture, the mixture comprising a dispersion of deasphalting residue in the first heavy oil fraction.

DETAILED DESCRIPTION

Figure 1:
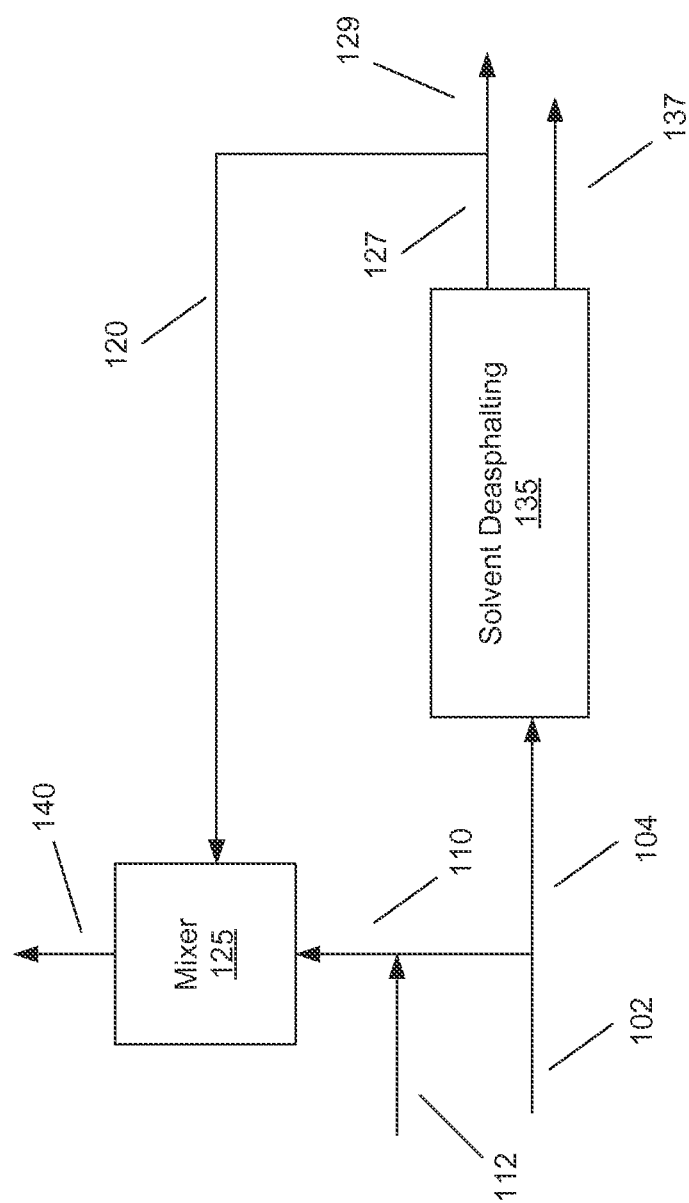
FIG. 1 schematically shows a system for forming a heavy oil and deasphalting residue mixture according to the disclosure.

All numerical values within the detailed description and the claims herein are modified by "about" or "approximately" the indicated value, and take into account experimental error and variations that would be expected by a person having ordinary skill in the art.

Overview

In various embodiments, a novel composition is provided that incorporates the residual solids from solvent deasphalting to make a high value asphalt product. A process for making the asphalt composition is also provided. For example, a first portion of heavy oil can be deasphalted using propane deasphalting or another suitable deasphalting process. This generates a fraction solvated by the propane and an insoluble deasphalting residue. The deasphalting residue is sometimes referred to as "rock." The deasphalting residue is then added to a second portion of heavy oil, such as a second portion of the same type of heavy oil that was used in the solvent deasphalting. The mixture of deasphalting residue and heavy oil results in a novel dispersion that is suitable for use as an asphalt. Optionally, an additive such as an alkyl substituted aromatic sulfonic acid can be added to the composition to further improve the asphalt properties.

Using a deasphalting residue to form an asphalt product allows an otherwise low value product to be used to form a higher value product. In other embodiments, combining the deasphalting residue with a second portion of heavy oil provides an advantage for forming an asphalt product in a non-refinery setting, such as at an oil extraction site. An oil extraction site often has a more limited selection of feedstocks available for forming products. A heavy oil corresponding to a distillation bottoms is often readily available, allowing the combined rock/heavy oil dispersion to be formed on site. Additionally, using the deasphalting residue to form an asphalt can reduce the amount of deasphalting residue to that is converted to $CO_2$, thus avoiding excess generation of greenhouse gases.

Feedstocks

Some feedstocks in accordance with the present disclosure are heavy oils that include at least a portion of asphaltenes. Such heavy oils are suitable, possibly after additional distillation, for making an asphalt. Asphalt is a viscoelastic semi-solid bituminous material derived from the distillation residue of crude petroleum. Asphalt may be obtained from a variety of heavy oil sources including straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like. Because it is hydrophobic and has good adhesive and weathering characteristics, asphalt is widely used as a binder or cement for stone or rock aggregate in pavement construction (typically only 5 wt % of the mixture). Other feedstocks suitable for use in the disclosure include whole or reduced petroleum crude oils, atmospheric residua feedstocks, and vacuum residua feedstocks.

One option for defining a boiling range is to use an initial boiling point for a feed and/or a final boiling point for a feed.

Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil. Similarly, a "T95" boiling is defined as the temperature at which 95 wt % of the feed will boil.

A typical feedstock for forming asphalt can have a normal atmospheric boiling point of at least 350° C., more typically at least 440° C., and will have a penetration range from 20 to 500 dmm at 25° C. (ASTM D-5). Alternatively, a feed may be characterized using a T5 boiling point, such as a feed with a T5 boiling point of at least 350° C., or at least 400° C., or at least 440° C. The amount of tower boiling point material in the feed may impact the total amount of diesel generated as a side product. After a deasphalting process, the deasphalted oil will typically have, for example, a final boiling point of 600° C. or less, or 550° C. or less, or 500° C. or less. Alternatively, a deasphalted oil may be characterized using a T95 boiling point, such as a deasphalted oil with a T95 boiling point of 600° C. or less, or 550° C. or less, or 500° C. or less.

Forming a Dispersion of Feed and Deasphalting Residue

In various embodiments, a first portion of a suitable feedstock (such as a bitumen or distillation bottoms) is processed via solvent deasphalting to form a deasphalted oil and a deasphalting residue. Solvent deasphalting is a solvent extraction process. Typical solvents include alkanes or other hydrocarbons containing 3 to 6 carbons per molecule. Examples of suitable solvents include propane, n-butane, isobutene, and n-pentane. Alternatively, other types of solvents may also be suitable, such as supercritical fluids. During solvent deasphalting, a feed portion is mixed with the solvent. Portions of the feed that are soluble in the solvent are then extracted, leaving behind a residue with little or no solubility in the solvent. Typical solvent deasphalting conditions include mixing a feedstock fraction with a solvent in a weight ratio of from 1:2 to 1:10. Typical solvent deasphalting temperatures range from 40° C. to 100° C. In some embodiments, conventional solvent deasphalting processes are suitable for use in generating deasphalting residues according to the disclosure.

The portion of the feedstock that is extracted with the solvent is often referred to as deasphalted oil. The yield of deasphalted oil from a solvent extraction process varies depending on a variety of factors, including the nature of the feedstock, the type of solvent, and the solvent extraction conditions. A lighter molecular weight solvent such as propane will result in a lower yield of deasphalted oil as compared to n-pentane, as fewer components of the heavy oil will be soluble in the shorter chain alkane. However, the deasphalted oil resulting from propane deasphalting is typically of higher quality, resulting in expanded options for use of the deasphalted oil. Under typical deasphalting conditions, increasing the temperature will also usually reduce the yield while increasing the quality of the resulting deasphalted oil. In various embodiments, the yield of deasphalted oil from solvent deasphalting can be 85 wt % or less of the heavy oil feed, or 75 wt % or less, or 65 wt % or less, or 50 wt % or less, or 30 wt % or less. Depending on the type of solvent and the deasphalting conditions, the deasphalted oil may be suitable for a variety of uses, such as use as a feed for making a lubricating oil basestock or use as a feed for fuels production.

After a deasphalting process, the yield of deasphalting residue is typically at least 15 wt %. Depending on the type of solvent used and the deasphalting conditions, the deasphalting residue yield can be higher, such as at least 25 wt %, or at least 35 wt %, or at least 50 wt %, or at least 70 wt %.

After generating a deasphalting residue from solvent deasphalting, the deasphalting residue can be added to a second portion of feedstock, such as a heavy oil feedstock. Preferably, the second portion of feedstock corresponds to the same (heavy oil) feedstock used for generating the deasphalting residue, but other crude oil or heavy oil fractions that contain asphaltenes can be used instead. The deasphalting residue is added to the second portion of feedstock in a weight ratio of between 30:70 to 70:30. The ratio of deasphalting residue to feedstock can vary depending on the grade of asphalt desired and the amount of deasphalting residue being generated. In some preferred embodiments, the ratio of deasphalting residue to feedstock is at least 35:65, or at least 40:60, or at least 50:50. Additionally or alternately, the ratio of deasphalting residue to feedstock is 65:35 or less, or 60:40 or less, or 50:50 or less.

Combining the deasphalting residue with the heavy oil results in a mixture. Typically the mixture is heated during the mixing process. Preferably, the mixture is heated to a temperature above the softening point or softening temperature for the deasphalting residue. Softening point can be defined, for example, as the temperature determined using the method from ASTM D36. The softening point represents the temperature when a bitumen sample will no longer support an object of a specified shape and weight.

The deasphalting residue and feedstock can be combined in any convenient manner. For example, one option is to add the deasphalting residue to the feedstock while heating the mixture. A second option is to add a dispersant to the feedstock and then add the dispersant/feedstock mixture to the deasphalting residue in the presence of heat. Still another option is to combine dispersant with the deasphalting residue, heat the deasphalting residue to the softening point, and then add the feedstock to the softened deasphalting residue/dispersant mixture.

When the deasphalting residue and heavy oil (or other feedstock) are combined, the mixture will typically be in the form of a dispersion of the deasphalting residue in the heavy oil. Because the heavy oil already contains asphaltenes, at least a portion of the deasphalting residue is likely to remain a solid in the heavy oil at equilibrium. Additionally, the kinetic barriers to solvation are believed to be relatively large, so the deasphalting residue is expected to remain in the heavy oil as a dispersion regardless of the equilibrium.

The deasphalting residue has some tendency to agglomerate or aggregate in the heavy oil. As a result, sonic of the dispersed solids in the heavy oil/deasphalting residue dispersion may be in the form of aggregated groups of solids. For convenience, both individual solids and aggregated groups of solids in the heavy oil dispersion will be referred to as deasphalting residue particles. Preferably, the size of the deasphalting residue particles in the heavy oil dispersion will typically be between 1 micron and 500 microns.

Optionally, one or more additives can be added to the heavy oil deasphalting residue mixture or dispersion, such as an additive to assist in achieving the desired size for the dispersed particles. Examples of suitable additives include sulfonic acids, such as alkyl substituted aromatic sulfonic acids. An example of a suitable alkyl substituted aromatic sulfonic acid is a linear or branched chain $C_8$-$C_{48}$ alkyl substituted aromatic sulfonic acid of the formula:

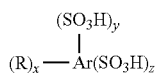

wherein x is an integer ranging from 1 to 5, preferably 1 to 3, more preferably 1 to 2; R is (a) a straight chain alkyl group of 8 to 48 carbons, preferably 10 to 36 carbons, more preferably 12 to 30 carbons, (b) a branched chain alkyl group wherein each branch is itself linear or branched and has from 8 to 24 carbons wherein each branch of the alkyl chain can have further branching with methyl, ethyl or mixtures of methyl and ethyl groups provided the total number of carbons attributable to the methyl and/or ethyl groups does not exceed 10, and the total number of carbons does not exceed 48, preferably does not exceed 36, or (c) mixtures of (a) and (b); y is an integer ranging from 0 to 4, preferably 0 to 2, more preferably 1 when z=0; z is an integer ranging from 0 to 4 preferably 0 to 2, more preferably 1 when y=0 and wherein (y+z) ranges from 1 to 4; and Ar is an aromatic moiety having 1, 2 or 3 rings, or a mixture thereof and wherein the multi ring aromatics are fused, spiro or linked by an alkylene linkage having 1 to 6 carbons, preferably 1 to 3 carbons, most preferably 1 carbon, preferably phenyl, naphthyl or anthracene, more preferably phenyl or naphthyl, most preferably phenyl.

When a sulfonic acid additive is added to deasphalting residue/heavy oil mixture according to the disclosure, the additive is added in an amount of from 0.5 to 10 wt % relative to the weight of the mixture, preferably 0.5 to 5.0 wt %, most preferably 1.0 to 3.0 wt %. The optional additive is added at a temperature of up to 175° C., preferably up to 170° C., more preferably up to 160° C., most preferably between 140 to 160° C. For other types of additives, the amount of additive and/or the temperature during addition of the additive can depend on the nature of the additive.

Example of Method for Forming Dispersion of Heavy Oil and Deasphalting Residue

FIG. 1 schematically shows an example of a system for forming a dispersion of a heavy oil (such as a bitumen or distillation bottoms) and deasphalting residue. A system such as FIG. 1 can represent a reaction train in a refinery setting for processing a heavy oil. Alternatively, a system such as FIG. 1 could be used at a facility near a petroleum source for processing of a whole or distilled crude after extraction.

FIG. 1 shows an initial heavy oil feed 102 that is processed in the system. A first portion of heavy oil 104 from heavy oil feed 102 is fed into a solvent deasphalting process 135. A second portion of heavy oil 110 from heavy oil feed 102 is fed into a mixer 125. In the example shown in FIG. 1, first portion of heavy oil 104 and second portion of heavy oil 110 are derived from a common heavy oil feed 102. In other embodiments, first portion 104 and second portion 110 can be represent different heavy oil compositions, such as different types of distillation residues and/or distillation residues based on different petroleum sources.

First portion of heavy oil 104 is processed in solvent deasphalting process 135. This results in a deasphalted oil 137 and a deasphalting residue (or "rock") 127. The use of deasphalted oil 137 can be dependent on the type of solvent deasphalting 135. For example, if solvent deasphalting 135 is a propane deasphalting process, deasphalted oil 137 may be suitable for use as a lubricant basestock. If solvent deasphalting 135 is a process using solvent with 4 or 5 carbon atoms per molecule, the deasphalted oil 137 can be used as a feed for fuels production. In a non-refinery setting, deasphalted oil 137 can represent an oil fraction that is suitable for transport by pipeline.

Deasphalting residue 127 can optionally be split into a first portion 120 and a second (optional) portion 129. The second (optional) portion 129 of the deasphalting residue can be used in a conventional manner. For example, a deasphalting residue can be used as an input for a gasifier. This allows for conversion of some of the deasphalting residue into useful products such as syngas or $H_2$. However, this conversion is also likely to produce $CO_2$. Alternatively, first portion 129 may be suitable for use as a low value asphalt.

First portion 120 of the deasphalting residue is used as another input for mixer 125. First portion 120 of the deasphalting residue is mixed 125 with portion 110 of heavy oil to produce an output composition 140. The output 140 is a dispersion of deasphalting residue in heavy oil. The deasphalting residue 120 and heavy oil portion 110 are mixed in a suitable ratio to provide an output composition 140 with improved asphalt properties, such as a ratio by weight of between 30:70 and 70:30. Optionally, the properties of output composition 140 can be further improved by adding one or more additives 112. Preferably, the additives 112 are introduced into the composition prior to or during mixing, such as by adding the additives 112 into heavy oil portion 110 prior to mixing.

Examples of Product Properties

One way of characterizing an asphalt composition is by using SUPERPAVE™ criteria. SUPERPAVE™ criteria (as described in the June 1996 edition of the AASHTO Provisional Standards Book and 2003 revised version) can be used to define the Maximum and Minimum Pavement service temperature conditions under which the binder must perform. SUPERPAVE™ is a trademark of the Strategic Highway Research Program (SHRP) and is the term used for new binder specifications as per AASHTO MP-1 standard. Maximum Pavement Temperature (or "application" or "service" temperature) is the temperature at which the asphalt binder will resist rutting (also called Rutting Temperature). Minimum Pavement Temperature is the temperature at which the binder will resist cracking. Low temperature properties of asphalt binders were measured by Bending Beam Rheometer (BBR). According to SUPERPAVE™ criteria, the temperature at which a maximum creep stiffness (S) of 300 MPa at 60 s loading time is reached, is the Limiting Stiffness Temperature (LST). Minimum Pavement Temperature at which the binder will resist cracking (also called Cracking Temperature) is equal to LST-10° C.

The SUPERPAVE™ binder specifications for asphalt paving binder performance establishes the high temperature and low temperature stiffness properties of an asphalt. The nomenclature is PG XX-YY which stands for Performance Grade at high temperatures (HT), XX, and at low temperatures (LT), -YY degrees C., wherein -YY means a temperature of minus YY degrees C. Asphalt must resist high summer temperature deformation at temperatures of XX degrees C. and low winter temperature cracking at temperatures of -YY degrees C. An example popular grade in Canada is PG 58-28. Each grade of higher or lower temperature differs by 6° C. in both HT and LT. This was established because the stiffness of asphalt doubles every 6° C. One can plot the performance of asphalt on a SUPERPAVE™ matrix grid. The vertical axis represents increasing high PG temperature stiffness and the horizontal axis represents decreasing low temperature stiffness towards the left. In some embodiments, a heavy oil fraction used for producing the deasphalted residue and/or the heavy oil fraction used for forming a mixture with the deasphalted residue can have a performance grade at high temperature of 58° C. or less, or 52° C. or less, or 46° C. or less.

Figure 2:
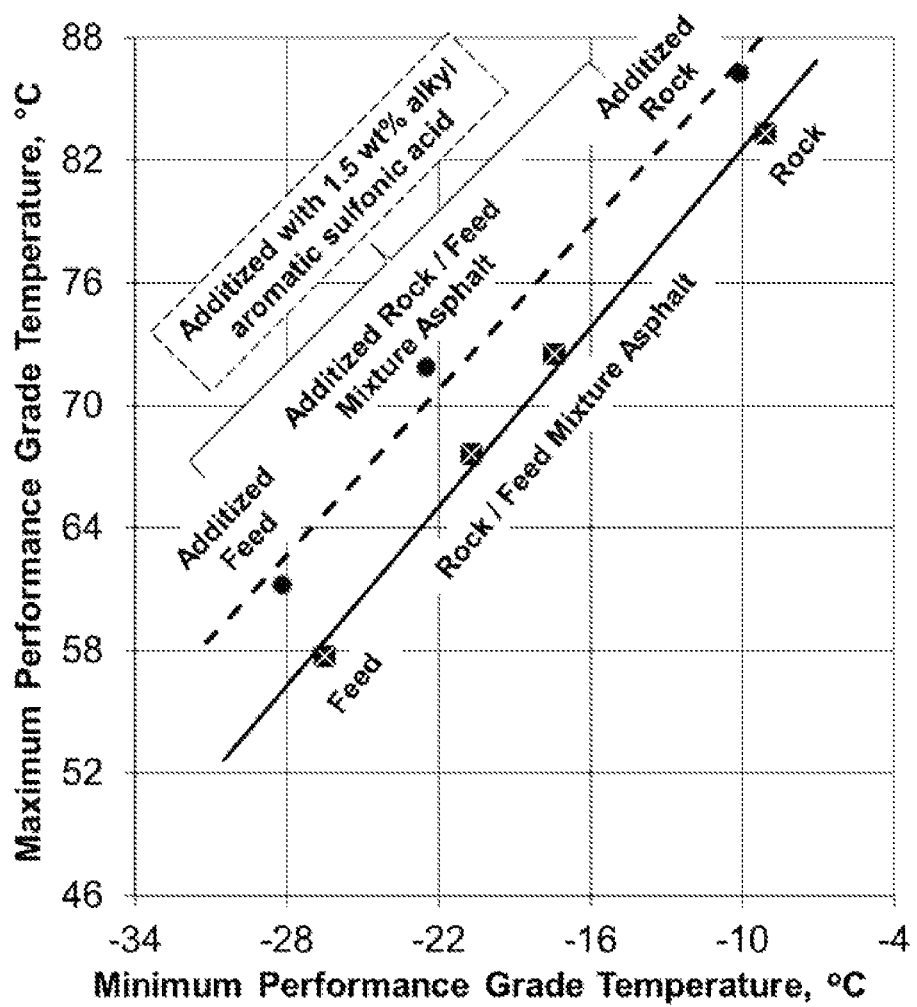
FIG. 2 shows examples of properties for various asphalt compositions.

The data in FIG. 2 is plotted on a SUPERPAVE™ PG matrix grid. These curves pass through various PG specification boxes. Asphalt binders from a particular crude pass the SUPERPAVE™ specification criteria if they fall within the PG box through which the curves pass. Directionally poorer asphalt performance is to the lower right. Target exceptional asphalt or enhanced, modified asphalt performance is to the upper left, most preferably in both the HT and LT performance directions.

Although asphalt falls within a PG box that allows it to be considered as meeting a given PG grade, the asphalt may not be robust enough in terms of statistical quality control to guarantee the PG quality due to variation in the PG tests. This type of property variation is recognized by the asphalt industry as being as high at approximately +/−3° C. Thus, if an asphalt producer wants to consistently manufacture a given grade of asphalt, such PG 64-28, the asphalt producer must ensure that the PG tests well within the box and not in the right lower corner of the box. Any treatment which moves the curve out of the lower right corner even if only in the HT direction is deemed to result in the production of a higher quality asphalt, even if nominally in the same grade.

FIG. 2 shows examples of two types of asphalts based on heavy oil/deasphalting residue dispersions according to the disclosure. For the data in FIG. 2, a heavy oil was deasphalted using propane as the solvent. The resulting deasphalting residue was blended back into the same type of heavy oil at various concentrations. The asphalts were then tested to determine SUPERPAVE™ performance grades.

In FIG. 2, the rightmost (solid) line represents a series of asphalt compositions based on compositions that do not include an additive. Data points are shown for the original heavy oil (labeled feed), for the deasphalting residue from solvent deasphalting of the heavy oil (labeled ROCK), and for mixtures containing 40 wt % and 60 wt % respectively of deasphalting residue in heavy oil. The line represents a linear fit of the four data points. As shown in FIG. 2, the initial heavy oil feed corresponds to a PG 52-22 asphalt (or possibly a PG 58-22 asphalt). This is a lower value asphalt, due in part to a low maximum performance grade temperature. Such an asphalt is suitable for use as a paving asphalt in relatively few locations in North America. The deasphalting residue from the heavy oil has a grade of PG 82-4. This is also a lower value asphalt, due in part to a high minimum performance grade temperature. This asphalt is also too hard to be used as a paving asphalt in North America. By blending the deasphalting residue with the heavy oil, asphalt compositions within intermediate PG values are generated, leading to asphalts with an overall higher value. The mixture of 40 wt % deasphalting residue and 60 wt % heavy oil (40:60 weight ratio) results in an asphalt with a grade of PG 64-16, white 60 wt % deasphalting residue and 40 wt % heavy oil results in an asphalt with a grade of PG 70-10. Note that 60 wt % deasphalting residue sample has been graded as PG 70-10 instead of PG 70-16 due to the composition being fatigue limited. Both of the deasphalting residue/heavy oil mixtures provide asphalts with an improved combination of asphalt properties. Additionally, both of these asphalt grades are suitable for use as paving materials in many southern and west coast portions of the United States. Thus, the example in FIG. 2 shows that addition of a low value deasphalting residue to another portion of the original heavy oil resulted in a higher value product.

Further improvements in asphalt properties can be achieved by introducing an additive into the composition. The left-most (dashed) line in FIG. 2 shows asphalt compositions that include the addition of 1.5 wt % of an alkyl substituted aromatic sulfonic acid to the composition. A composition with 50:50 weight ratio of feed and deasphalting residue resulted in an asphalt with a grade that is possibly PG 70-22 but that might repeatably only generate PG 64-22 or PG 64-16. Even at 64-16, the 50:50 weight ratio asphalt including the 1.5 wt % additive results in an asphalt suitable for use in paving throughout a large portion of the United States. Increasing the amount of additive to greater than 1.5 wt % could further push this asphalt into PG 64-22 or PG 70-22, leading to an asphalt suitable for use in most of North America. This demonstrates that addition of additives is also effective for improving the properties of the novel deasphalting residue/heavy oil mixtures according to the disclosure.

Based on the linear fit lines in FIG. 2, it is clear that other asphalt grades can be generated if desired by controlling the weight ratio of deasphalting residue to heavy oil and by incorporating additives into the mixtures.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. An asphalt composition, comprising:
a mixture of a first heavy oil fraction and a deasphalting residue from solvent deasphalting of a second feedstock fraction, the first heavy oil fraction having a T5 boiling point of at least 350° C., the second feedstock fraction having a T5 boiling point of at least 350° C.,
wherein a weight ratio in the mixture of the first heavy oil fraction relative to the deasphalting residue is from 30:70 to 70:30, and further comprising up to 10 wt % of an alkyl substituted aromatic sulfonic acid,
wherein the mixture of the first heavy oil fraction and the deasphalting residue comprises a dispersion of deasphalting residue in the first heavy oil fraction wherein the size of the dispersed particles is from 1 micron to 500 microns, and wherein the composition has performance grade at low temperature of −10° C. or less and a performance grade at high temperature of at least 64° C.

2. The asphalt composition of claim 1, wherein the alkyl substituted aromatic sulfonic acid is a linear or branched chain $C_8$-$C_{48}$ alkyl substituted aromatic sulfonic acid of the formula:

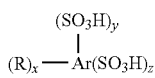

wherein x is an integer ranging from 1 to 5; R is (a) a straight chain alkyl group of 8 to 48 carbons, (b) a branched chain alkyl group wherein each branch is itself linear or branched and has from 8 to 24 carbons wherein each branch of the alkyl chain can have further branching with methyl, ethyl or mixtures of methyl and ethyl groups provided the total number of carbons attributable to the methyl and/or ethyl groups does not exceed 10, and the total number of carbons does not exceed 48, or (c) mixtures of (a) and (b); y is an integer ranging from 0 to 4; z is an integer ranging from 0 to 4 and wherein (y+z) ranges from 1 to 4; and Ar is an aromatic moiety having 1, 2 or 3 rings, or a mixture thereof and wherein the multi ring aromatics are fused, spiro or linked by an alkylene linkage having 1 to 6 carbons.

3. The asphalt composition of claim 1, wherein the first heavy oil fraction comprises a first portion of a heavy oil feed and the second feedstock fraction comprises a second portion of the heavy oil feed.

4. The asphalt composition of claim 1, wherein the first heavy oil fraction comprises a portion of a first heavy oil feed and the second feedstock fraction comprises a portion of a second heavy oil feed different from the first heavy oil feed.

5. The asphalt composition of claim 1, wherein the deasphalting residue is a deasphalting residue from propane deasphalting of the second feedstock.

6. An asphalt composition, comprising:
a mixture of a first portion of a heavy oil fraction and a deasphalting residue from solvent deasphalting of a second portion of the heavy oil fraction, the heavy oil fraction having a T5 boiling point of at least 350° C.,
wherein the mixture of the first portion of a heavy oil fraction and the deasphalting residue comprises a dispersion of deasphalting residue in the first portion of a heavy oil fraction wherein the size of the dispersed particles is from 1 micron to 500 microns, and wherein the composition has performance grade at low temperature of −10° C. or less and a performance grade at high temperature of at least 64° C., and
wherein a weight ratio in the mixture of the first portion of the heavy oil fraction and the deasphalting residue is from 30:70 to 70:30.

7. The asphalt composition of claim 6, the composition further comprising up to 10 wt % of an alkyl substituted aromatic sulfonic acid.

8. The asphalt composition of claim 6, wherein the heavy oil fraction has a performance grade at high temperature of 58° C. or less.

9. A method for producing an asphalt composition, comprising:
performing solvent deasphalting on a second feedstock fraction to produce a deasphalted oil and a deasphalting residue; and
mixing the deasphalting residue with a first heavy oil fraction having a T5 boiling point of at least 350° C., and up to 10 wt % of an alkyl substituted aromatic sulfonic acid to form a mixture, the mixture comprising a dispersion of deasphalting residue in the first heavy oil fraction,
wherein the mixture of the first heavy oil fraction and the deasphalting residue comprises a dispersion of deasphalting residue in the first heavy oil fraction, wherein the size of the dispersed particles is from 1 micron to 500 microns, and wherein the composition has performance grade at low temperature of −10° C. or less and a performance grade at high temperature of at least 64° C., and
wherein a weight ratio in the mixture of the first portion of the heavy oil fraction and the deasphalting residue is from 30:70 to 70:30.

10. The method of claim 9, further comprising mixing a dispersion additive into at least one of the first heavy oil fraction and the mixture of deasphalting residue and the first heavy oil, the amount of dispersion additive being up to 10 wt % of the mixture.

11. The method of claim 9, wherein the first heavy oil fraction comprises a first portion of a heavy oil feed and the second feedstock fraction comprises a second portion of the heavy oil feed.

12. The method of claim 9, further comprising heating at least one of the deasphalting residue or the first heavy oil fraction during said mixing.

13. The method of claim 12, wherein the heating during said mixing comprises heating at least one of the deasphalting residue or the mixture of the deasphalting residue and the first heavy oil fraction to at least the softening point of the deasphalting residue.

\* \* \* \* \*